(12) United States Patent
Blose

(10) Patent No.: US 10,364,084 B2
(45) Date of Patent: *Jul. 30, 2019

(54) FLEXIBLE PACKAGE WITH TAMPER-EVIDENT ANTI-COUNTERFEITING LABEL AND METHOD OF MAKING THE SAME

(71) Applicant: Fres-co System USA, Inc., Telford, PA (US)

(72) Inventor: Travis Christopher Blose, Telford, PA (US)

(73) Assignee: Fres-co System USA, Inc., Telford, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,845

(22) Filed: Aug. 2, 2018

(65) Prior Publication Data

US 2018/0339830 A1   Nov. 29, 2018

Related U.S. Application Data

(63) Continuation of application No. 15/440,074, filed on Feb. 23, 2017, now Pat. No. 10,040,617.

(60) Provisional application No. 62/328,783, filed on Apr. 28, 2016.

(51) Int. Cl.
| | |
|---|---|
| *B65D 79/02* | (2006.01) |
| *B65D 75/30* | (2006.01) |
| *G03H 1/00* | (2006.01) |
| *B65C 1/02* | (2006.01) |

(52) U.S. Cl.
CPC ............... *B65D 79/02* (2013.01); *B65C 1/02* (2013.01); *B65D 75/30* (2013.01); *G03H 1/0011* (2013.01); *B65D 2101/0015* (2013.01); *B65D 2203/02* (2013.01); *G03H 2001/0055* (2013.01)

(58) Field of Classification Search
CPC .......... B65C 1/02; B65D 75/30; B65D 75/52; B65D 75/58; B65D 79/02; B65D 2101/0015; B65D 2203/02; G03H 1/00; G03H 1/0011; G03H 2001/0055
See application file for complete search history.

(56) References Cited

U.S. PATENT DOCUMENTS

| | | |
|---|---|---|
| 3,854,581 A | 12/1974 | Jones, Jr. |
| 3,983,645 A | 10/1976 | Rycroft |
| 5,366,087 A | 11/1994 | Bane |

(Continued)

OTHER PUBLICATIONS

Website page re DuPont Trademark IZON downloaded on May 18, 2017 at http://www.dupont.com/products-and-services/packaging-materials-solutions/anti-counterfeiting-solutions/brands/izon-3d-hologram-technology.view-all.hlm-usesapplications-usesapplication.html.

*Primary Examiner* — Bryon P Gehman
(74) *Attorney, Agent, or Firm* — Caesar Rivise, PC

(57) ABSTRACT

A flexible package having a tamper evident product authentication label secured thereto and methods of making the same are disclosed. The package includes at least one panel having a heat seal line. The label has an outer surface with authentication indicia appearing thereon and an inner surface adhesively secured to the package adjacent the heat seal line. The label includes peripheral portions that are frangible, with one of the frangible peripheral portions of the label being located within a portion of the area made up by the heat seal line. Accordingly, attempted removal of the label from the package will cause the label to tear, leaving at least a portion of the peripheral edge of the label secured to the package to thereby prevent reuse of the label.

24 Claims, 1 Drawing Sheet

(56) References Cited

U.S. PATENT DOCUMENTS

| | | |
|---|---|---|
| 5,893,587 A | 4/1999 | Wong |
| 6,589,622 B1 | 7/2003 | Scott |
| 6,646,771 B2 | 11/2003 | Stevenson |
| 7,576,898 B2 | 8/2009 | Multeni et al. |
| 7,718,104 B2 | 5/2010 | MacDonald et al. |
| 8,365,979 B2 | 2/2013 | Messmer et al. |
| 8,530,045 B2 | 9/2013 | MacDonald et al. |
| 9,382,043 B2 | 7/2016 | Rummo |
| 9,501,958 B2 | 11/2016 | Pietarinen et al. |

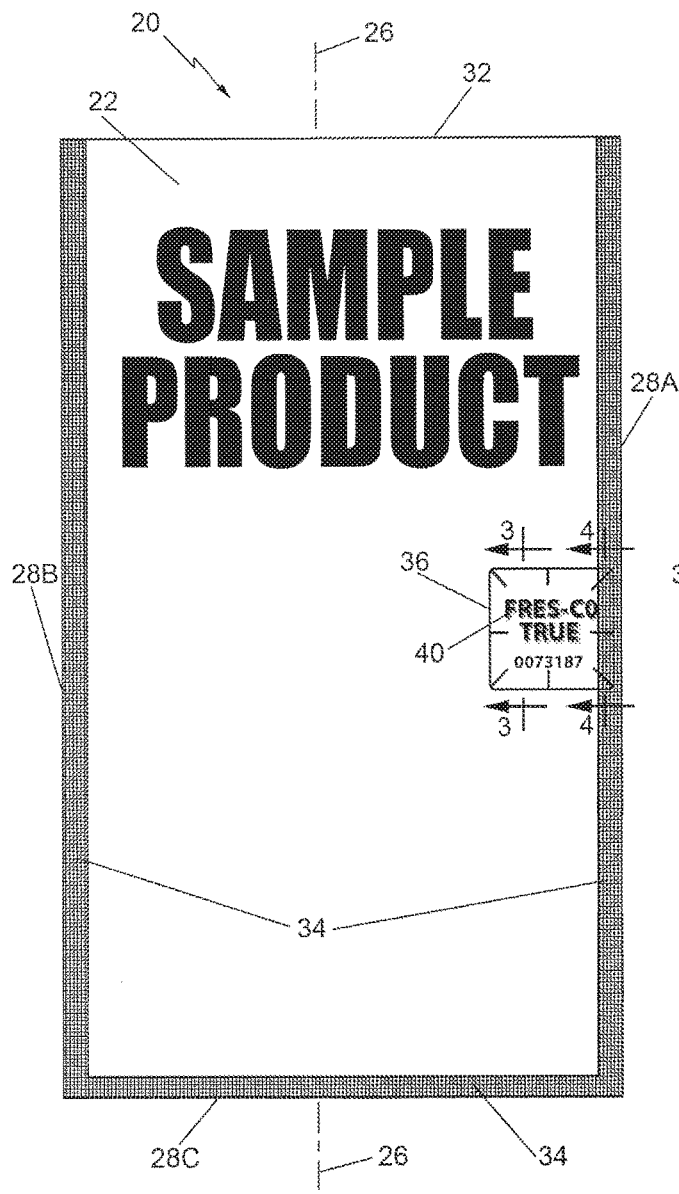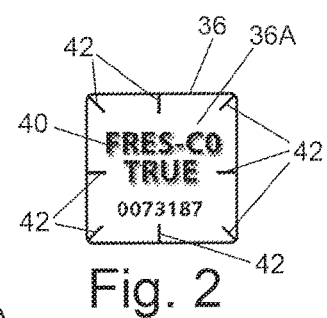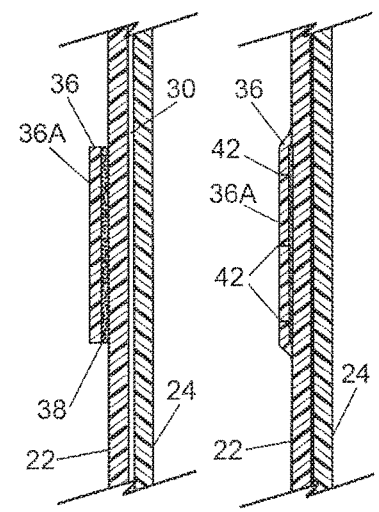
Fig. 1  Fig. 2  Fig. 3  Fig. 4

FLEXIBLE PACKAGE WITH TAMPER-EVIDENT ANTI-COUNTERFEITING LABEL AND METHOD OF MAKING THE SAME

CROSS-REFERENCE TO RELATED APPLICATION

This application is a Continuation Application of, and takes the benefit under 35 U.S.C. § 120 of, application Ser. No. 15/440,074 filed on Feb. 23, 2017, which in turn takes the benefit under 35 U.S.C. § 119(e) of Provisional Application Ser. No. 62/328,783, filed on Apr. 28, 2016, Flexible Package With Tamper-Evident Anti-Counterfeiting Label and Method Of Making The Same, whose disclosures are specifically incorporated in their entireties by reference herein and which applications are assigned to the same assignee as this invention.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to flexible packages and more particularly to flexible packages provided with tamper-evident anti-counterfeiting labels and methods of making such packages.

BACKGROUND OF THE INVENTION

Various types of flexible packages are known for storing liquids, granular, powders and the like. Such packages may be in the form of a stand-up pouch, a gusseted pouch or bag, a flat or pillow-shaped pouch, etc. Such packages are typically formed from a web of flexible stock material, e.g., polyethylene, polyester, polypropylene, metal foil, and combinations thereof in single or multiple plies, and having at least one heat sealed seam or line joining contiguous portions of the package together.

E.I. DuPont de Nemours provides tamper-evident holograms under the trademark IZON®. The holograms are provided in the form of adhesive labels which are applied onto the outer surface of flexible packaging holding some product, whereupon the hologram provides an indication of authenticity of the product to deter counterfeiting of the product. Such labels also commonly include tamper-evident features, e.g., score lines or other frangible portions contiguous with the periphery of the labels, so that if one attempts to pry the label off of the package to which it had initially been adhesively secured, the label will tear rendering it incapable of reuse. Notwithstanding those features of the prior art, it has been determined that such tamper-evident authenticating labels can be removed from the packaging by a solvent or some other means to break the adhesive securement of the label on the package without damaging the label, whereupon the label can then be reused to place it on another package, e.g., a package containing a counterfeit product.

Thus, the need exists for a package including a label, like an IZON® hologram label, but which is secured to the flexible package in such a manner that it cannot be removed without damage to the label, thereby preventing its reuse by providing evidence of tampering.

The subject invention addresses that need.

SUMMARY OF THE INVENTION

One aspect of this invention is a flexible package for holding a product therein and including a tamper-evident product authenticating label. The tamper-evident product authenticating label comprises a panel having an outer surface, an inner surface and indicia appearing at the outer surface. The indicia indicate the authenticity of the product within the package. The undersurface of the label is secured to a portion of the outer surface of one of the plural wall portions. The label has a first peripheral edge portion which is frangible and a second peripheral edge portion located within a heat seal at a portion of the outer surface of the one of the plural wall portions, whereupon attempted removal of the label from the wall portion causes the label to tear adjacent the at least one first peripheral edge portion, leaving at least a portion of the second peripheral edge portion secured to the package by the heat seal.

In accordance with one aspect of the package of this invention the wall portions are secured together by a heat seal line, and wherein the undersurface of the label is secured to a portion of the outer surface of one of the plural wall portions contiguous with the heat seal line, and with the second peripheral edge portion being located within a portion of the area of the heat seal.

In accordance with another preferred aspect of the package of this invention the first peripheral portion of the label includes a plurality of scored or otherwise weakened lines extending inward from the periphery of the label.

Another aspect of this invention entails a method of making a flexible package for a product. The method comprises providing a first panel and second panel, each of the panels being formed of a flexible material. The panels are juxtaposed so that one of the first and second panels is disposed over the other of the first and second panels. A tamper-evident product authenticating label is provided. The label includes a first peripheral edge portion which is frangible and a second peripheral edge portion. The label is adhesively secured onto an outer surface of at least one of the panels. The second peripheral edge portion of the label is secured to at least one of the first and second panels by a heat seal, whereupon the second peripheral edge portion of the label is within of a portion of the area made up by the heat.

In accordance with one aspect of the method of this invention the heat seal comprises a heat seal line and wherein the heat seal line seals the first and second panels to each other.

In accordance with another aspect of the method of this invention the first peripheral portion of the label includes a plurality of scored or otherwise weakened lines extending from the periphery of the label.

DESCRIPTION OF THE DRAWING

FIG. 1 is a plan view of one exemplary embodiment of a flexible package having a tamper evident, product authentication label secured thereto;

FIG. 2 is a slightly enlarged plan view of the tamper evident, product authentication label shown in FIG. 1;

FIG. 3 is an enlarged sectional view taken along line 3-3 of FIG. 1; and

FIG. 4 is an enlarged sectional view taken along line 4-4 of FIG. 1.

DETAILED DESCRIPTION OF THE PREFERRED EMBODIMENT

Referring now to the various figures of the drawing wherein like reference characters refer to like parts, there is shown at 20 in FIG. 1 one exemplary embodiment of a package including a tamper-evident product authenticating label constructed in accordance with this invention. The exemplary package shown in FIG. 1 is in the form of a flat pouch or bag, but can be any other type of flexible package, e.g., a stand-up bag or pouch, a gusseted bag or pouch, etc., providing that the package includes at least one heat seal line or seam. In the exemplary embodiment of FIG. 1 the package has a front panel 22 (FIGS. 1, 3 and 4), and a back or rear panel 24 (FIG. 4). The panels are formed of two sheets or webs of any suitable flexible stock material, e.g., polyethylene, polyester, polypropylene, metal foil, and combinations thereof in single or multiple plies. The two sheets are of generally rectangular shape, having a longitudinal central axis, 26. The sheets are juxtaposed over each other and are fixedly secured together along three of their peripheral edges 28A, 28B and 28C to form a hollow interior space 30 (FIG. 3). In particular, the panels 22 and 24 are secured together along one long side edge 28A, along the opposite long side edge 28B and along a transverse bottom edge 28C by heat sealing.

It should be pointed out at this juncture that the package 20 may be fabricated out of a single sheet or web of flexible packaging material, instead of using two sheets. In that alternative construction the single sheet of flexible packaging material is folded in half parallel to its longitudinal axis 26. Thus, one of the long side edges, 28A or 28B will be formed by the folded portion of the sheet, while the other of those long side edges will be a heat sealed edge.

The top edge 32 of both panels 22 is unsecured to serves as the mouth of the package 20. It is through the mouth of the package that the contents of the packages can be introduced into the interior 30. After filling the package may be sealed along a transverse heat seal line (not shown) extending along or closely parallel to the top edges 32 of the panels.

Irrespective of the shape or construction of the panels 22 and 24 making up the package 20, the sealing or joining of the package's edges can be accomplished by various conventional techniques, e.g., heat sealing, ultrasonic sealing, etc. One preferred technique entails the application of at least one heated bar to the edge portions of the panels to cause them to fixedly bond to each other. The heated bar(s) used for sealing the edges can be completely flat or can have a textured surface. To produce the exemplary embodiment of the package 20, the heat sealing bar(s) are textured to produce a waffle pattern heat seal line 34. This feature is desirable in the interest of ease of visibility of the heat seal lines, but is not mandatory. Thus, if desired the heat-sealing bars used to produce the heat seals can be un-textured.

As can be seen from FIG. 1, the panel 22 forms the front wall of the package and will typically include indicia, e.g., the name of the product contained in the package (in this case the words "SAMPLE PRODUCT") and possibly other advertising or promotional materials. The rear panel 24 forms the back wall of the package and also may include indicia on it, e.g., the product's ingredients, instructions for use, warnings, etc.

In order to provide a means for authenticating the package and its contents, i.e., to reveal to a potential purchaser and/or user that the package and its contents is genuine and not counterfeit, the package 20 includes a tamper-evident product authenticating label 36. The label may be constructed utilizing the teachings of U.S. Pat. Nos. 6,646,771, 7,576,898, 7,718,104 and 8,530,045 or other conventional prior art, e.g., the aforementioned IZON® product of DuPont.

As best seen in FIG. 2, the label 34 is a very thin flat panel of any desired shape and size. The exemplary embodiment of the label 36 is of a square shape having rounded corners. That shape is merely exemplary. Thus, it is contemplated that the label can be of any desired shape, regular or irregular and of any suitable size. The label is formed of any suitable flexible material, e.g., a plastic film of single or multiple plies, and includes a front or top surface 36A from which holographic indicia 38, e.g., three dimensional indicia, and other indicia are visible, e.g., when exposed to a point light source the indicia appear to float over a background, thereby making product authentication simple.

In the exemplary embodiment of the label 36 shown in FIGS. 1 and 2, the holographic indicia is in the form of the words "FRES-CO TRUE" and a serial number. As best seen in FIG. 3, the undersurface of the label 36 includes an adhesive 40 that serves to fixedly secure the label onto the outer surface of the panel 22. In particular, the label 36 is fixedly secured onto the outer surface of the front panel or wall 22 of the package adjacent its long side edge 28A, as will be described in more detail later.

The material making up the label's body is scored or otherwise rendered frangible by plural weakened lines 42 in portions of its periphery. In particular, one such weakened line 42 is located in each corner and one such weakened line is located at the midpoint of each side edge of the label. The weakened lines 42 extend inward from the periphery of the label and terminate towards the center of the label. The weakened lines 42 serve as a tear-initiating point for the label. As such, when the label is adhesively secured in place on a portion of a wall panel of the package, if one attempts to pull the label off that wall portion, the label will start to tear at one of the weakened lines. Moreover, that initiated tear will propagate across a contiguous portion of the label, thereby rendering the label incapable of reuse, since it will be damaged.

As mentioned above, it has been determined that one can remove a label like the IZON® label if it is merely adhesively secured to a wall panel by use of a suitable solvent to break the adhesive seal. Thus, if such a solvent is used to break the adhesive bond between the label and the package, the label can be removed from, e.g., peeled off, the package without breaking any of the weakened lines. In such a case, since the label will be undamaged it is susceptible for reuse on a counterfeit package. That risk of unauthorized label reuse is eliminated by the securement of the label in accordance with the teachings of this invention.

In particular, the label 36 is located at a place on the package so that some portion of the periphery of the label will be located within a heat seal line 34, as shown clearly in FIG. 1. By so doing the portion of the label within the bounds of the heat seal line 34 will be fused to the wall of the package, such as shown in FIG. 4. Thus, there will be some portion of the label that will be fixedly secured to the package and will remain fixedly secured to the package even if a solvent is used to attempt to break the adhesive bond between the adhesive 38 on the underside of the label and the package. As such, if one were to attempt to pull or peal the label off of the wall of the package, the peripheral portion of the label within the bounds (area) of the heat seal line will hold that portion of the label in place so that attempting to pull the label off of the package will result in the label tearing, with the tear beginning at one of the weakened lines 42 located outside the bounds of the heat seal line 34.

In accordance with the exemplary embodiment shown in FIG. 1, the label 36 is located so that its right side peripheral edge portion is located within the bounds of the heat seal line 28A on the right side of the package. That is merely exemplary. Thus, the label 36 could be fixedly secured by its adhesive 38 to either the front wall 22 or the rear wall 24 of the package 20 at any location so that a peripheral portion of the label is within the bounds of either of the heat seal lines 28A, 28B or 28C. It should be appreciated by those skilled in the art that the label 36 can be adhesively secured so that a peripheral portion of the label is within the bounds of any other heat seal line, e.g., the heat seal line (not shown) that is used to close the mouth of the package after the package has been sealed, or any other heat seal line forming a portion of the package. If the package is a stand-up pouch or a gusseted bag or pouch or any other flexible package the label 36 can be adhesively secured to any panel of that package providing that a peripheral edge portion of the label is within the bounds of any heat seal line of that package.

It should be pointed out at this juncture that this invention contemplates a variety of types, sizes and shapes of flexible packages for which product authentication is desirable. Thus, the packages of this invention can be used to hold any type of product and may, if desired, include a one-way valve (not shown) other components, e.g., fitments, handles, etc., depending upon the application for such packages.

It should also be noted that in lieu of mounting the label so that a peripheral portion of it lies within a portion of a heat seal line of the package, this invention contemplates that the label can be mounted between layers or plies of a multi-layer or laminated wall panel. As such, the label is protected from being removed by the overlying layer of the wall panel.

Without further elaboration the foregoing will so fully illustrate my invention that others may, by applying current or future knowledge, adopt the same for use under various conditions of service.

I claim:

1. A flexible package for holding a product therein, said package comprising:
   a) a plurality of wall portions secured together to form said package, wherein said package includes an outer surface; and
   b) a tamper-evident label comprising a panel having an outer surface, an undersurface and indicia indicating authenticity of the product within said package, said undersurface of said label being secured to a portion of said outer surface of said package, said label having a first peripheral edge portion which is frangible and a second peripheral edge portion located within a heat fixedly secured seal at a portion of said one of said plurality of wall portions, whereupon attempted removal of said label from said one of said plurality of wall portions causes said label to tear adjacent said at least one first peripheral edge portion, leaving at least a portion of said peripheral edge portion secured to said package by said heat fixedly secured seal.

2. The flexible package of claim 1 wherein said plurality of wall portions are secured together by a heat or ultrasonic seal line, wherein said heat fixedly secured seal comprises a portion of said heat or ultrasonic seal line, and wherein said undersurface of said label is secured to a portion of said outer surface of said package contiguous with said heat or ultrasonic seal line.

3. The flexible package of claim 2 wherein said package comprises a flat pouch or bag and wherein said heat or ultrasonic seal line forms one edge of said package.

4. The flexible package of claim 2 wherein said undersurface of said label is secured to said portion of said outer surface of one of said package by an adhesive.

5. The flexible package of claim 2 wherein said indicia is in the form of a hologram.

6. The flexible package of claim 2 wherein said heat seal line is textured.

7. The flexible package of claim 1 wherein said label includes a periphery and wherein said first peripheral portion of said label includes a plurality of weakened lines extending inward from said periphery of said label.

8. The flexible package of claim 7 wherein said undersurface of said label is secured to said portion of said outer surface of said package by an adhesive.

9. The flexible package of claim 1 wherein said undersurface of said label is secured to said portion of said outer surface of said package by an adhesive.

10. The flexible package of claim 9 wherein said indicia is in the form of a hologram.

11. The flexible package of claim 1 wherein said indicia is in the form of a hologram.

12. The flexible package of claim 1 wherein said heat seal is textured.

13. A method of making a flexible package for a product, said method comprising:
   a) providing a first panel and second panel, wherein one of said first and second panels is disposed over the other of said first and second panels, and wherein each of said first and second panels are formed of a flexible material and has an outer surface;
   b) securing a tamper evident label onto the outer surface of one of said first and second panels, said tamper evident label including a first peripheral edge portion which is frangible and a second peripheral edge portion; and
   c) heat sealing said second peripheral edge portion of said label to at least one of said first and second panels by a heat or ultrasonic seal, whereupon said second peripheral edge portion of said tamper evident label is within of a portion of the area made up by said heat or ultrasonic seal.

14. The method of claim 13 wherein said heat or ultrasonic seal comprises a heat or ultrasonic seal line and wherein said heat or ultrasonic seal line seals said first and second panels to each other.

15. The method of claim 14 wherein said package comprises a flat pouch or bag and wherein said heat or ultrasonic seal line forms one edge of said package.

16. The method of claim 14 wherein said heat seal is textured.

17. The method of claim 14 wherein said indicia is in the form of a hologram.

18. The method of claim 14 wherein said label is adhesively secured to said outer surface of one of said first and second panels.

19. The method of claim 13 wherein said label includes a periphery, and wherein said first peripheral portion of said label includes a plurality of weakened lines extending inward from said periphery of said label.

20. The method of claim 19 wherein said label is adhesively secured to said outer surface of one of said first and second panels.

21. The method of claim 13 wherein said indicia is in the form of a hologram.

22. The method of claim 21 wherein said label is adhesively secured to said outer surface of one of said first and second panels.

23. The method of claim 13 wherein said heat seal is textured.

24. The method of claim 13 wherein said label is adhesively secured to said outer surface of one of said first and second panels.

* * * * *